United States Patent [19]

Bendiks

[11] 4,112,466

[45] Sep. 5, 1978

[54] FLAT TELEVISION SCREEN

[76] Inventor: Donald J. Bendiks, 1020 W. Water St., New Buffalo, Mich. 49117

[21] Appl. No.: 695,023

[22] Filed: Jun. 11, 1976

[51] Int. Cl.² .............................................. H04N 3/14
[52] U.S. Cl. .............................. 358/241; 315/169 TV; 340 324 M; 340/166 EL
[58] Field of Search ..................... 340/324 M, 166 EL; 315/169 TV; 358/241, 59

[56] References Cited

U.S. PATENT DOCUMENTS

| | | | |
|---|---|---|---|
| 3,249,804 | 5/1966 | Aiken | 315/169 TV |
| 3,300,581 | 1/1967 | Steinmeyer | 315/169 TV |
| 3,532,809 | 10/1970 | Witmer | 315/169 TV |
| 3,566,014 | 2/1971 | Norem | 315/169 TV |

Primary Examiner—S. C. Buczinski
Attorney, Agent, or Firm—Walter Leuca

[57] ABSTRACT

A television screen comprising an electroluminescent sheet sandwiched with electroconductive sheets. Electrical pulse signals responsive to a horizontal sweep input are applied to the sides of two of the electroconductive sheets, and pulse signals responsive to a vertical sweep input are applied to the top and bottom of two of the electroconductive sheets. The pulses are modulated with the video input. The signals propagating across the sheets produce a dot at the intersection point, which moves in accordance with the pattern of the sweep signals to produce a video picture.

2 Claims, 4 Drawing Figures

FLAT TELEVISION SCREEN

BACKGROUND OF THE INVENTION

1. Field of the Invention

This invention relates to an electroluminescent display device and more particularly to television screens.

2. Description of the Prior Art

In the prior art, television screens in common use are long in dimension, bulky in size as well as limited in viewing area. Consequently, television receiving sets are large in dimension. The cathode ray or picture tubes of television sets are expensive to manufacture. Another serious disadvantage to the employment of cathode ray tubes is that they are hazardous in that they are fragile and contain a vacuum thereby making it subject to implosions. Also, due to the bulkiness of the tube, the location of use of the television set is limited. Current design of cathode ray tubes requires a protective covering therefor and is generally not used separate from the chassis and circuitry.

SUMMARY OF THE INVENTION

Accordingly, I have invented a novel and unique television screen which is extremely economical to manufacture, is rugged in construction, is not restrictive in use in that it may be used separable from the chassis or circuitry and is not restricted in viewing area size. My invention, in summary, comprises a plurality of sheets in planular juxtaposition. At least one of these sheets is electroluminescent in characteristic. Others of these plurality of sheets are electroconductive and in combination are contiguous to the electroluminescent sheet. Other of these plurality of sheets are electrically resistant in characteristic to isolate each of the electroconductive sheets. The electroconductive sheets have means to receive voltage signals thereacross along the X axis thereof and other electroconductive sheets have means to receive voltage signals thereacross along the Y axis thereof. Synchronized pulses received by the receiver provide the scanning voltages for the horizontal and vertical by converting them to the appropriate signals similarly to the control of the electronic gun of a cathode ray tube of the prior art. According to the teaching of my invention, I utilize these scanning voltages of the prior art to synchronize periodic delayed repetitive pulses to the incoming video of the television receiver. I provide a repetitive pulse generator to provide a voltage pulse across one of the electroconductive sheets along the X axis. The repetitive pulse generator in another circuit combines with the horizontal scanning voltage of the prior art in a delayed circuit device to provide periodic delay pulse output with respect to repetitive fed into the first mentioned sheet. The delayed pulse output of the delayed circuit feeds into the second electroconductive sheet juxtaposed to the first mentioned electroconductive sheet along the X axis. Between these two electroconductive sheets is a sheet of electroluminescent phosphor. The electroluminescent phosphor is sandwiched and contiguous between the two electroconductive sheets when the delayed pulse voltage on the second sheet, when it travels through the sheet in one X direction combines with the repetitive pulse traveling in the first sheet.

The delayed pulse of the delayed circuit and the 2nd sheet in the X direction meets the repetitive pulse from the generator being fed to the 1st sheet from the opposite X direction. The line of meeting of these pulses will be through the phosphor at or below the luminescent threshold. A repetitive pulse from the generator is fed into a 3rd electroconductive sheet in a Y direction. This third sheet is juxtaposed to the second electroconductive sheet which is separated therefrom by a resistance sheet. The vertical scanning voltage of the prior art combines in a delay circuit device to produce a delay pulse output which is fed to a 4th sheet in the opposite Y direction in relation to the repetitive pulse in the Y direction. This delayed pulse output in the opposite Y direction is applied to the 4th sheet to travel in the opposite direction of the repetitive pulse in the Y direction of the 3rd sheet. Where these X and Y pulse lines juxtaposedly meet in their respective sheets, the voltage intensity at these points of intersection of all the pulse lines is great enough to activate the phosphor to glow to provide a scanning dot and raster.

The result is that as the delayed pulse travels through the 2nd sheet it will align with the repetitive pulse at different positions with each repetition scan according to the delay produced by the scanning voltage of the prior art. This occurs from both X and Y pulses. This scanning dot produced by the alignment and intersection of the X and Y pulses scans the phosphor sheet in synchronization with the transmitter and produces the raster on the photo viewing screen. The intensity of the pulse voltage is varied by the incoming video and this causes the variation in the luminescense of the phosphor sheet to reproduce the camera image.

It is obvious that such a viewing screen, being only electrically connected to the chassis circuitry, may be highly mobile and being flat may be placed in a number of different locations merely by moving the flat screen of my invention and mounting it on a wall away from the receiver circuit chassis and connected thereto only electrically.

DESCRIPTION OF THE PREFERRED EMBODIMENT

Figure 1:
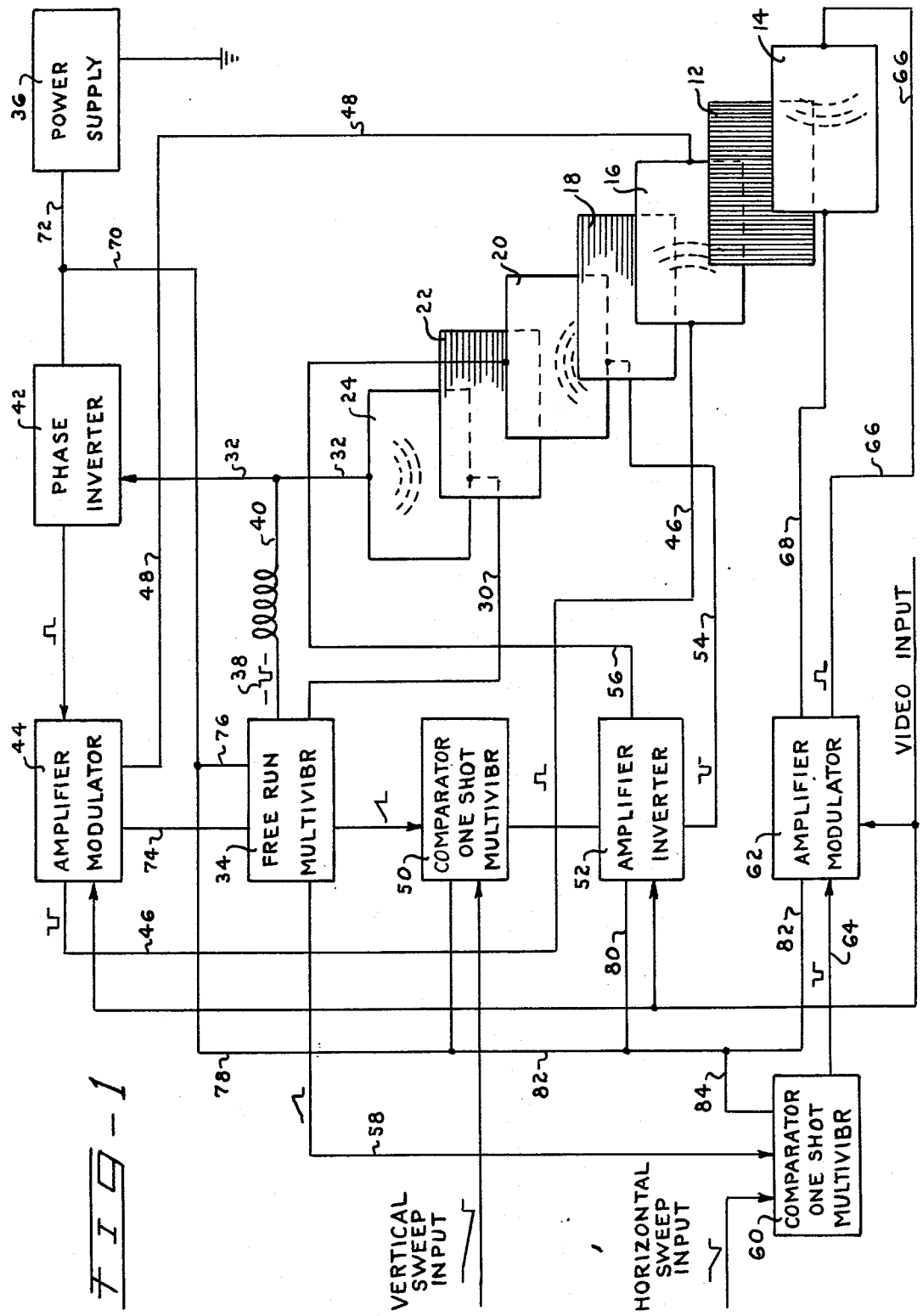
FIG. 1 symbolically shows an exploded view of my novel television screen, and a functional block diagram of associated electronic circuitry.

Referring now to the drawings wherein is illustrated a preferred embodiment of my invention, numeral 10 designates generally the preferred embodiment thereof. With particular reference to FIG. 1, my invention 10 comprises an electroluminescent phosphor material layer 12 sandwiched between a transparent electroconductive sheet 14 and an electroconductive sheet 16. Layered contiguous to sheet 16 is a resistive sheet 18 such as for example made from carbon material or material having like resistive characteristics. Layered contiguous to sheet 18 is electroconductive sheet 20 such as for example a sheet made from copper or aluminum. Layered contiguous to sheet 20 is another resistive sheet 22 and layered contiguous to sheet 22 is another electroconductive sheet 24. The series of contiguous sheets 12 through 24 are formed integral and electrically insulated around the edge surfaces thereof. The theory of my invention is that the phosphor material layer 12 will at predetermined point electroluminess when subjected at that point to a voltage potential across the phosphor. This voltage pulse in sheet 14 is introduced by conductors 66 and 68, connected at the X axis ends of sheet 14 to include sheet 14 in the horizontal scanning circuitry of the receiver unit. The voltage pulse in sheet 16 is similarly introduced by conductors 46 and 48 connected at the X axis ends of sheet 16 to include sheet 16 in the horizontal scanning circuitry of the receiver unit. Sheets 14 and 16 included in the horizontal scanning circuitry provide the horizontal scanning effect. The voltage pulses entering sheets 14 are in a direction opposite to the voltage pulses entering sheet 16. Resistive sheets 18 and 22 electrically isolates electroconductive sheets 16, 20 and 24 to maintain the integrity of the circuit of sheets 16, 20 and 24.

Figure 2:
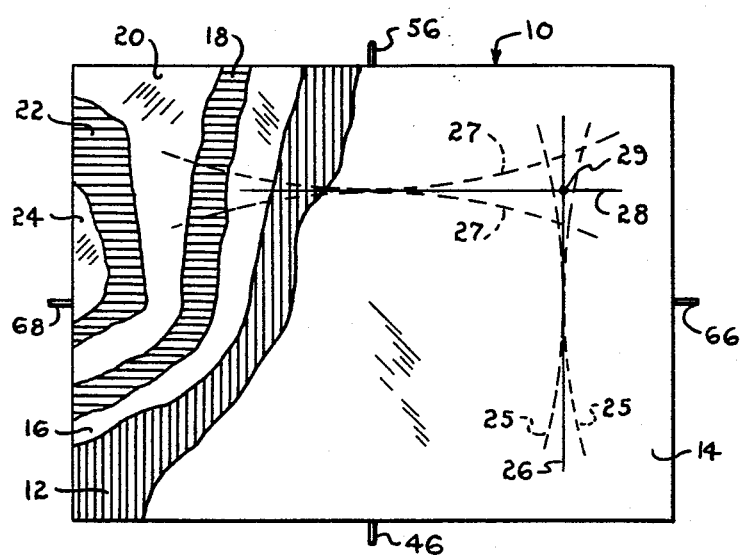
FIG. 2 is a front elevation of the television screen of my invention with parts thereof broken away.
Figure 3:
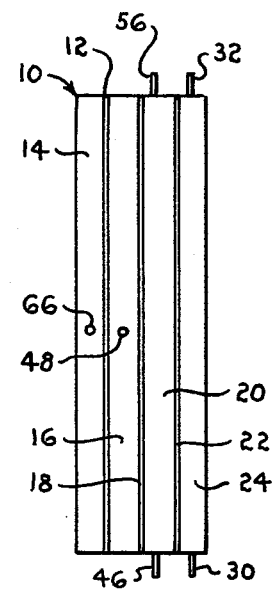
FIG. 3 is an end view of the planular sheets of the television screen of my invention, the thickness of the planular sheets are greatly enlarged to illustrate the relative thickness of the sheets between them.
Figure 4:
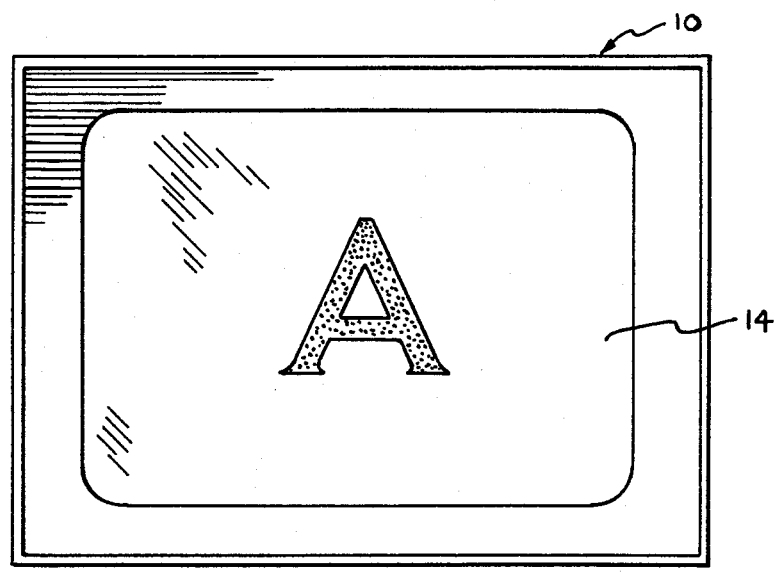
FIG. 4 is a front elevation of the television screen as it would appear in actual use.

Electroconductive sheets 20 and 24 receive voltage pulses by means of conductors 54 and 56, 30 and 32 respectively which are connected to the Y axis of the ends of sheets 20 and 24 thereby including sheets 20 and 24 respectively in the vertical scanning circuitry of the receiver unit. Sheets 20 and 24 included in the vertical scanning circuitry provide the vertical scanning effect. The voltage pulses entering sheet 20 is in a direction opposite to the voltage pulses entering sheet 24. The horizontal voltage pulses through sheets 14 and 16 illustrated by numeral 25 normally operate below the electroluminescent threshold of the phosphor material layer 12, but voltages above this threshold will produce a vertical resultant luminescent line 26 (see FIG. 2) visible through sheet 14. The vertical voltage pulses through sheets 20 and 24 illustrated by numeral 27 similarly and normally operate below the electroluminescent threshold of the phosphor material layer 12 which if above this threshold would produce a horizontal resultant luminescent line 28 visible through sheet 14. Normally the resultant lines 26 and 28 of voltage of the individual horizontal and vertical voltage pulses 25 and 27, respectively, are below the threshold of the phosphor layer 12 and exceed the threshold only when the horizontal and vertical voltage pulses intersect combining their voltage potentials to produce an electroluminescent dot 29. The brightness of dot 29 varies as a function of the video.

The position of dot 29 on screen 14 varies as a function of the free running multi-vibrator pulses with respect to the delayed circuitry pulses. I provide a free running multi-vibrator 34 running off the power supply source 36. The output of vibrator 34 is connected to sheet 24 through fixed delay line 40 which shifts the resultant pulses of coincidence about ½ screen length in order for scanning to start at the beginning of the screen and the circuit is completed by conductor 32 and 33 to the vibrator 34. The vibrator 34 is the repetitive voltage pulse source. The pulses of vibrator 34 are determined by screen size. The limits being at the higher frequency in order not to introduce two or more pulses appearing in the screen at the same time. The lower limits are determined by the sensitivity of the phosphor layer which determines its threshold and also determined by the persistence of phosphor and vision. The vibrator 34 feeds to the phase invertor 42 (by 32) so that horizontal sheet 16 would have the proper negative polarity after the pulse from the phase invertor 42 goes through amplifier modulator 44 by line 46. Line 46 goes to horizontal sheet 16 and returns to amplifier modulator 44 on return line 48. The amplifier modulates the pulse by the video signal.

The free running multi-vibrator 34 also produces a pulse the width of the screen which is converted to a saw tooth voltage by a differentiating network (circuit not shown). This saw tooth voltage feeds into a delay circuit vertical comparator one shot multi-vibrator 50 also with the vertical sweep input of the prior art and at coincidence of the two wave forms produces a pulse output which is delayed depending upon the voltages at the particular time. The pulses pass through an amplifier invertor 52 the purpose being to change phase for the proper voltage and also for the pulse to receive the video modulation. The pulse goes to sheet 20 through conductor 54 and the return conductor 56. This completes the vertical circuit. For the horizontal sweep, the free running multi-vibrator 34 passes the saw tooth voltage through conductor 58 to the horizontal delay circuit comparator one shot multi-vibrator 60 which also has the horizontal sweep input of the prior art.

The horizontal one shot multi-vibrator 60 produces a delayed pulse as a result of the coincidence of the free running multi-vibrator saw tooth voltage and the horizontal sweep input of the prior art signal which feeds into amplifier modulator 62 through conductor 64 which modulates the pulse by the video input. The output of the amplifier modulator 62 goes to sheet 14 by conductor 66 and returns by conductor 68. Conductors 70, 72, 76, 78, 80, 82 and 84 are power supply line branches.

I claim:

1. A television apparatus comprising: a plurality of sheets in planular juxtaposition, at least one of said sheets being an electroluminescent sheet, and other of said sheets being electroconductive sheets and electrically resistant sheets, means responsive to a horizontal sweep input to apply electrical pulse signals to propagate horizontally through two of said electroconductive sheets so that in one sheet the electrical pulse signals propagate from left to right and in the other from right to left, means responsive to a vertical sweep input to apply electrical pulse signals to propagate vertically through two of said electroconductive sheets so that in one sheet the electrical pulse signals propagate from top to bottom and in the other from bottom to top, means to modulate said electrical pulse signals with a video input, so that said electroluminescent sheet produces an electroluminescent dot at a point where the horizontal and vertical pulse signals intersect while propagating through the electroconductive sheets, said electroluminescent sheet being interposed between two of said electroconductive sheets, and an electrically resistant sheet being interposed between each of the remaining planular juxtaposed electroconductive sheets, said sheets having an order from first to last, one of said electroconductive sheets for horizontal signals, said electroluminescent sheet, the other electroconductive sheet for horizontal signals, an electrically resistant sheet, one of said electroconductive sheets for vertical signals, another electrically resistant sheet, and the other electroconductive sheet for vertical signals.

2. A television apparatus comprising: a plurality of sheets in planular juxtaposition, at least one of said sheets being an electroluminescent sheet, and other of said sheets being electroconductive sheets and electrically resistant sheets, means responsive to a horizontal sweep input to apply electrical pulse signals to propagate horizontally through two of said electroconductive sheets so that in one sheet the electrical pulse signals propagate from left to right and in the other from right to left, means responsive to a vertical sweep input to apply electrical pulse signals to propagate vertically through two of said electroconductive sheets so that in one sheet the electrical pulse signals propagate from top to bottom and in the other from bottom to top, means to modulate said electrical pulse signals with a video input, so that said electroluminescent sheet produces an electroluminescent dot at a point where the horizontal and vertical pulse signals intersect while propagating through the electroconductive sheets, said electroluminescent sheet being interposed between two of said electroconductive sheets, and an electrically resistant sheet being interposed between each of the remaining planular juxtaposed electroconductive sheets, said sheets having an order from first to last, one of said electroconductive sheets for vertical signals, said electroluminescent sheet, the other electroconductive sheet for vertical signals, an electrically resistant sheet, one of said electroconductive sheets for horizontal signals, another electrically resistant sheet, and the other electroconductive sheet for horizontal signals.

* * * * *